United States Patent
Tanaka et al.

(10) Patent No.: US 9,956,896 B2
(45) Date of Patent: *May 1, 2018

(54) TEMPERATURE ADJUSTMENT CONTROL DEVICE

(71) Applicant: DENSO CORPORATION, Kariya, Aichi-pref. (JP)

(72) Inventors: Yasuhiro Tanaka, Kariya (JP); Atusi Sakaida, Kariya (JP); Norio Gouko, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/300,588

(22) PCT Filed: Jun. 1, 2015

(86) PCT No.: PCT/JP2015/002741
§ 371 (c)(1),
(2) Date: Sep. 29, 2016

(87) PCT Pub. No.: WO2015/186329
PCT Pub. Date: Dec. 10, 2015

(65) Prior Publication Data
US 2017/0144574 A1  May 25, 2017

(30) Foreign Application Priority Data

Jun. 3, 2014 (JP) ................................. 2014-114825
May 13, 2015 (JP) ................................. 2015-098408

(51) Int. Cl.
*H01C 7/10* (2006.01)
*B60N 2/56* (2006.01)

(52) U.S. Cl.
CPC ......... *B60N 2/5657* (2013.01); *B60N 2/5692* (2013.01)

(58) Field of Classification Search
CPC .......................... B60N 2/5657; B60N 2/5692
(Continued)

(56) References Cited

U.S. PATENT DOCUMENTS 6,079,485 A * 6/2000 Esaki ................. B60H 1/00285
165/42
6,105,667 A * 8/2000 Yoshinori .......... B60H 1/00285
165/202

(Continued)

FOREIGN PATENT DOCUMENTS

JP 2000356357 A 12/2000
JP 2006066299 A 3/2006
(Continued)

*Primary Examiner* — Kyung Lee
(74) *Attorney, Agent, or Firm* — Harness, Dickey & Pierce, P.L.C.

(57) ABSTRACT

A temperature adjustment control device includes a heat diffusion layer, a heat flux sensor, and a temperature changing body provided in this order from a surface making contact with a human body. The heat flux sensor is disposed on the temperature changing body and outputs a sensor signal corresponding to a heat flux. The heat diffusion layer is disposed opposite to the temperature changing body through the heat flux sensor. The heat flux sensor outputs the sensor signal corresponding to the heat flux passing through the heat flux sensor in a direction in which the heat diffusion layer, the heat flux sensor, and the temperature changing body are arranged. A control portion controls a start and a stop of the power supply to the temperature changing body based on the sensor signal outputted from the heat flux sensor.

7 Claims, 14 Drawing Sheets

(58) Field of Classification Search
USPC .......................................................... 338/22 R
See application file for complete search history.

(56) References Cited

U.S. PATENT DOCUMENTS

| | | | | |
|---|---|---|---|---|
| 6,700,052 | B2* | 3/2004 | Bell | H01L 35/32 |
| | | | | 136/201 |
| 6,719,624 | B2* | 4/2004 | Hayashi | B60H 1/00285 |
| | | | | 454/120 |
| 6,848,742 | B1* | 2/2005 | Aoki | B60N 2/5635 |
| | | | | 297/180.14 |
| 9,659,416 | B2* | 5/2017 | Tanaka | B60R 16/023 |
| 2007/0095378 | A1* | 5/2007 | Ito | B60N 2/5657 |
| | | | | 136/203 |
| 2016/0125671 | A1* | 5/2016 | Tanaka | B60R 16/023 |
| | | | | 701/33.9 |
| 2016/0141733 | A1* | 5/2016 | Shiraishi | H01M 10/625 |
| | | | | 320/136 |

FOREIGN PATENT DOCUMENTS

| | | | |
|---|---|---|---|
| JP | 2011187619 A | 9/2011 | |
| JP | 2015013636 A | 1/2015 | |

* cited by examiner

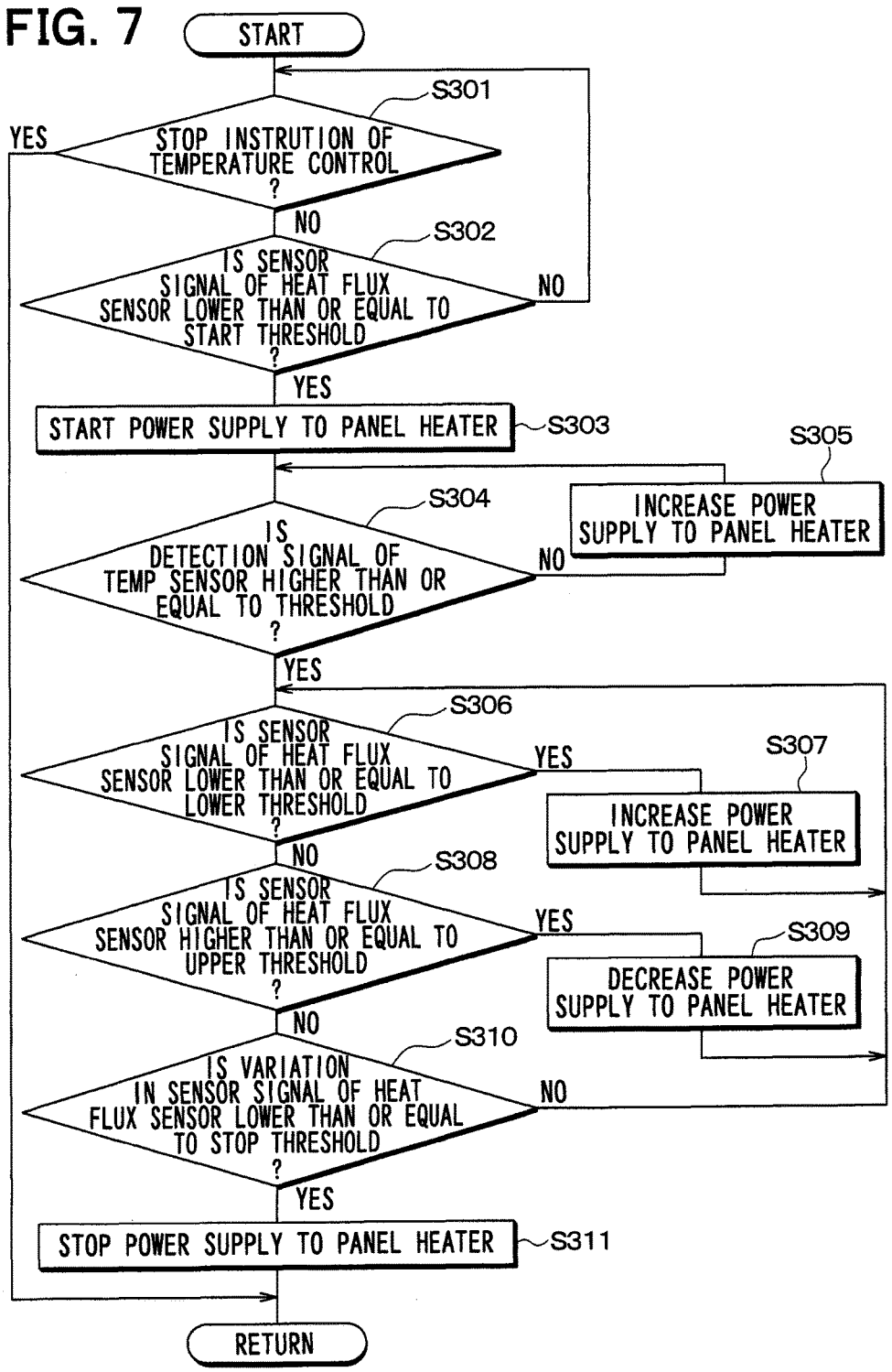

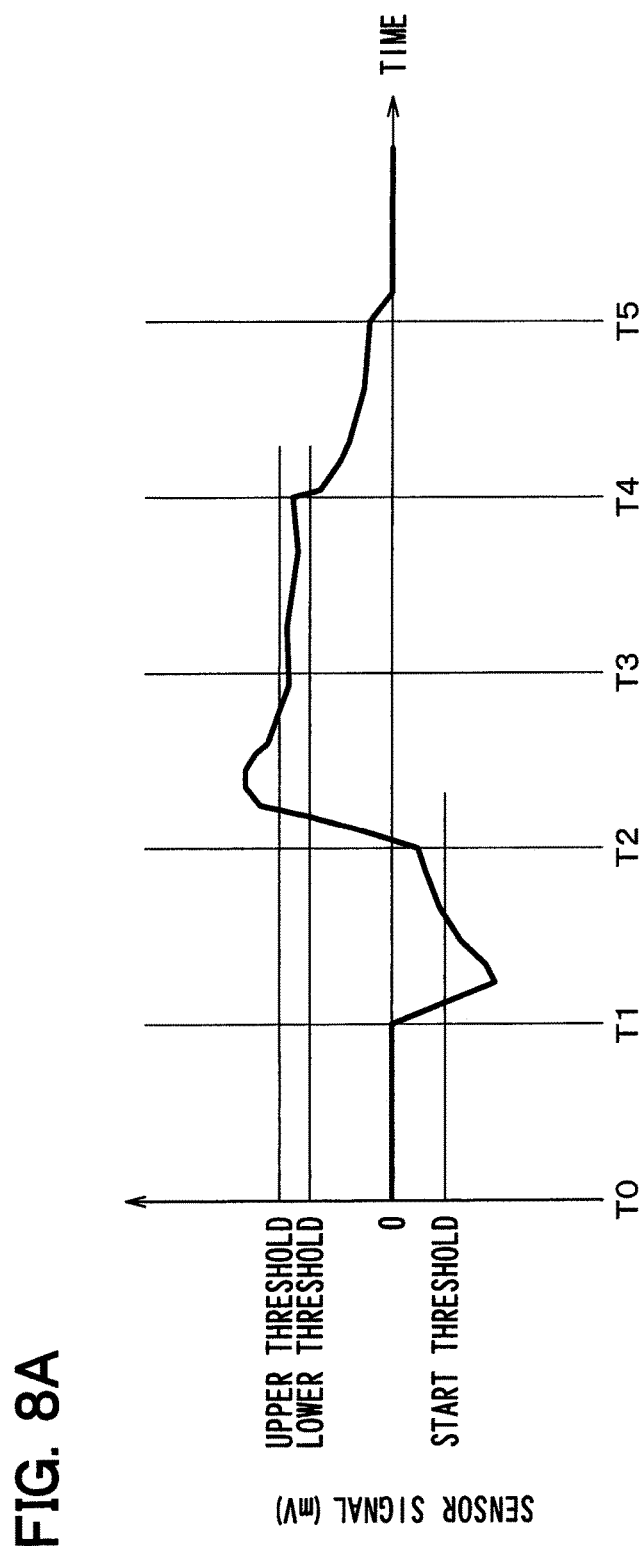

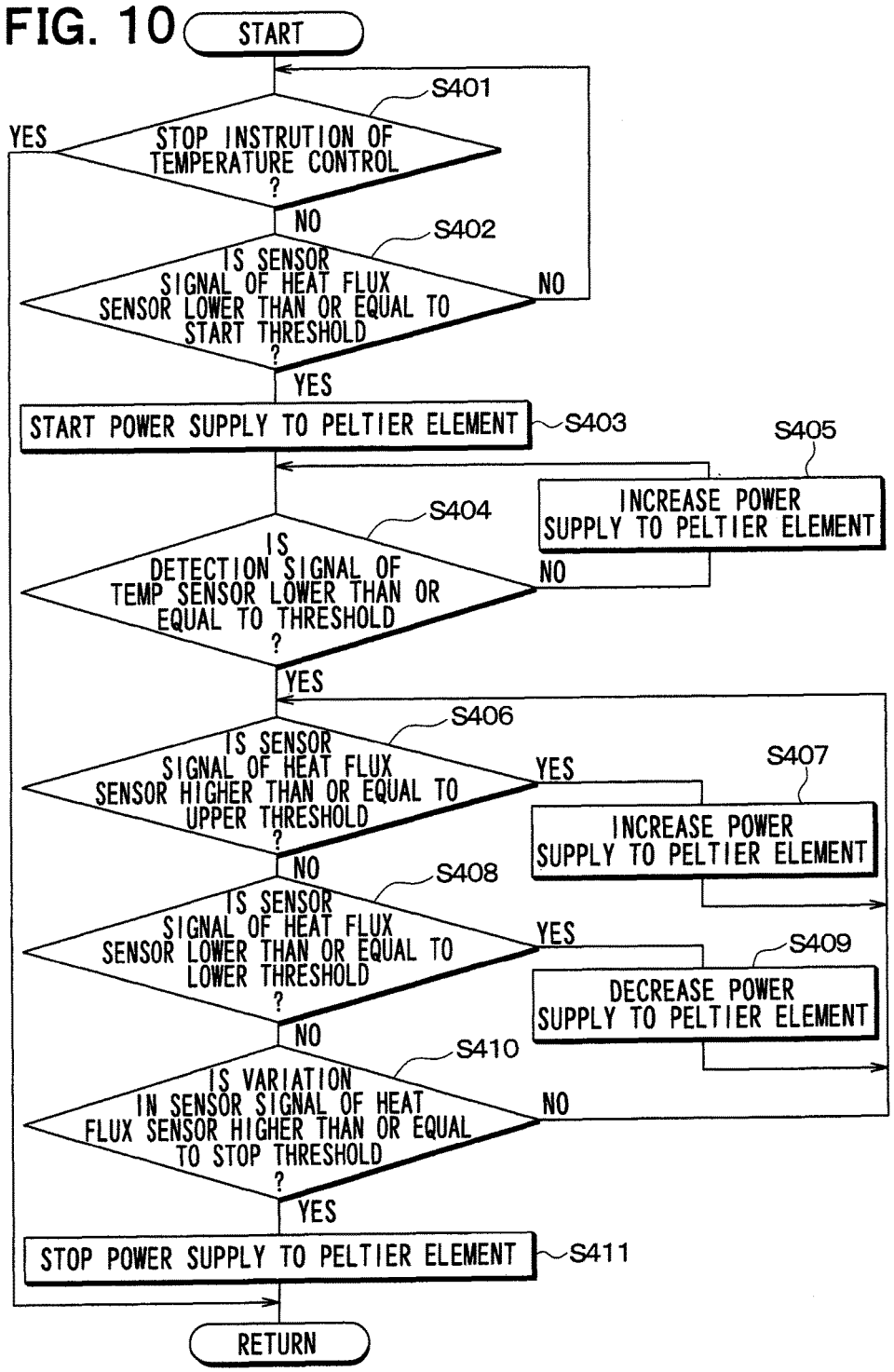

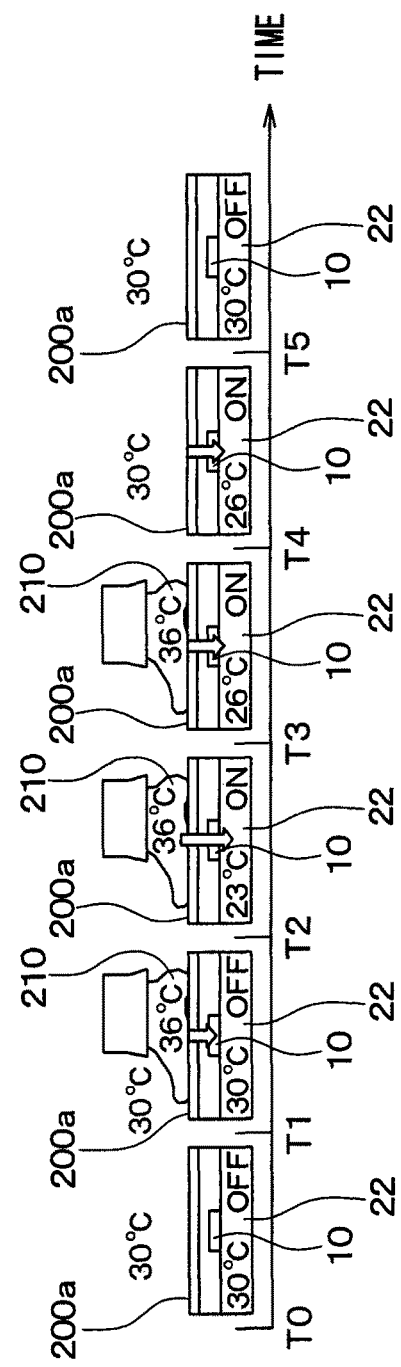

TEMPERATURE ADJUSTMENT CONTROL DEVICE

CROSS REFERENCE TO RELATED APPLICATIONS

This application is a U.S. National Phase Application under 35 U.S.C. 371 of International Application No. PCT/JP2015/002741 filed on Jun. 1, 2015 and published in Japanese as WO 2015/186329 A1 on Dec. 10, 2015. This application is based on and claims the benefit of priority from Japanese Patent Application No. 2014-114825 filed on Jun. 3, 2014, and Japanese Patent Application No. 2015-098408 filed on May 13, 2015. The entire disclosures of all of the above applications are incorporated herein by reference.

TECHNICAL FIELD

The present disclosure relates to a temperature adjustment control device using a heat flux sensor.

BACKGROUND ART

Patent Literature 1 proposes an electrical carpet as a temperature adjustment control device including a heater as a temperature changing body which becomes hot when energized, a controller which controls energization of the heater, and a pyroelectric sensor as a human body detection portion.

More specifically, the electrical carpet also includes a cover making contact with the human body. The heater is disposed inside the cover, and the pyroelectric sensor is disposed outside the cover. When the pyroelectric sensor detects infrared light from the human body, presence of the human body is determined and the heater is energized. When absence of the human body is determined, energization of the heater is stopped. In short, energization of the heater is started and stopped under automatic control.

PRIOR ART LITERATURES

Patent Literature

Patent Literature 1: JP 2000-356357A

SUMMARY OF INVENTION

However, when the human body moves slowly, a variance of infrared light is too small, because using the pyroelectric sensor to detect the human body. In this case, the electrical carpet may fail to detect the human body. That is to say, energization of the heater may not be started even when the human body is present on the electric carpet, or energization of the heater may not be stopped even when the human body is absent on the electric carpet.

The same applies to a temperature adjustment control device using a temperature changing body which becomes cold when energized in a case where a pyroelectric sensor is used to detect a human body.

An object of the present disclosure is to provide a temperature adjustment control device capable of controlling energization of a temperature changing body more accurately.

According to an aspect of the present disclosure, a temperature adjustment control device includes: a temperature changing body changing a temperature when energized; a heat flux sensor disposed on the temperature changing body and outputting a sensor signal corresponding to a heat flux; a heat diffusion layer disposed opposite to the temperature changing body through the heat flux sensor so as to cover the heat flux sensor; and a control portion that controls the temperature of the temperature changing body by controlling power supply to the temperature changing body. The heat diffusion layer, the heat flux sensor, and the temperature changing body are arranged sequentially from a side of a surface making contact with a human body. The heat flux sensor outputs the sensor signal corresponding to the heat flux passing through the heat flux sensor in a direction in which the heat diffusion layer, the heat flux sensor, and the temperature changing body are arranged. The control portion controls a start and a stop of the power supply to the temperature changing body based on the sensor signal outputted from the heat flux sensor.

Because a heat flux is generated whenever the human body makes contact with the surface or the human body moves away from the surface, power supply to the temperature changing body is controlled on the basis of the heat flux. The heat flux depends on whether the human body is in contact with the surface and does not depend on a motion speed of the human body. Hence, power supply to the temperature changing body can be controlled more accurately.

For example, the control portion may perform a temperature control to regulate the power supply to the temperature changing body such that the heat flux between the surface and the temperature changing body becomes constant after the power supply to the temperature changing body is started.

Power supply to the temperature changing body is controlled to make a heat flux between the surface and the temperature changing body constant. That is to say, when the human body is in contact with the surface, power supply to the temperature changing body is controlled for a heat flux between the human body and the surface to be constant. Consequently, a temperature environment the human body feels comfortable with can be presented over a long period.

In this case, the temperature adjustment control device may further include a temperature sensor outputting a detection signal corresponding to a temperature of the surface. The control portion may regulate an amount of the power supply to the temperature changing body to adjust the temperature of the surface to a predetermined temperature based on the detection signal from the temperature sensor after the power supply to the temperature changing body is started and before the temperature control is performed.

An amount of power supply to the temperature changing body is regulated to adjust the temperature of the surface to the predetermined temperature before the temperature control is performed. Hence, a time taken until the human body feels comfortable can be shortened. For example, given that the temperature changing body is a heating element, when power supply to the temperature changing body is started without adjusting a temperature of the surface as above in a state where a body surface temperature of the human body is low, power supply to the temperature changing body is controlled to make a heat flux between the human body and the surface constant while the body surface temperature of the human body is low. In short, an amount of power supply to the temperature changing body is not increased for a while even when the human body feels cold. Hence, by raising a temperature of the surface to the predetermined temperature before the temperature control is performed, a time taken until the human body feels comfortable can be shortened.

BRIEF DESCRIPTION OF DRAWINGS

FIG. 7 is a flowchart depicting operation of a control portion;

FIG. 8A is a timing chart showing a relation between a sensor signal and a time;

FIG. 10 is a flowchart depicting operation of a control portion;

FIG. 11C is a timing chart showing a relation between a heat flux and a time.

DESCRIPTION OF EMBODIMENTS

Figure 1:
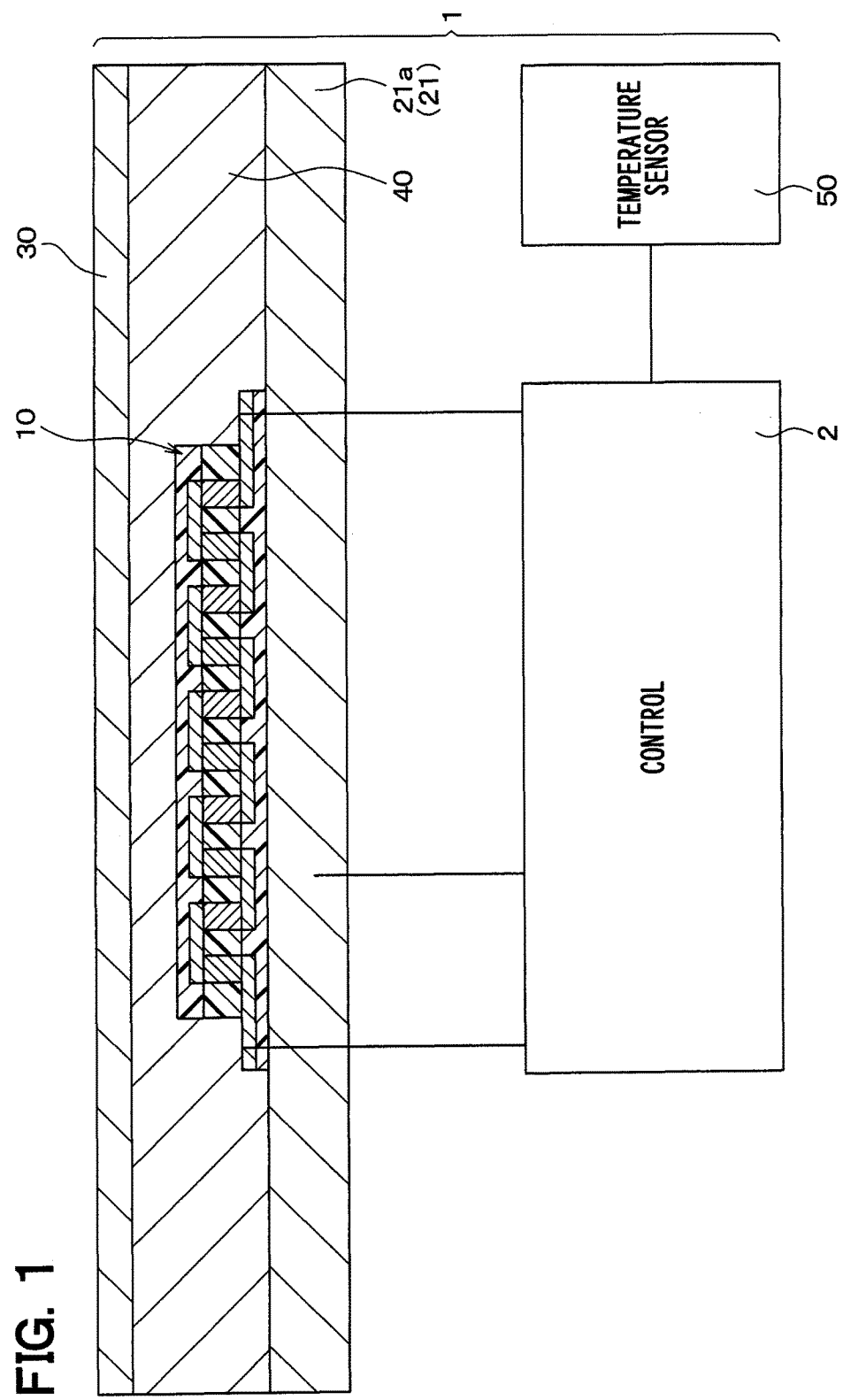
FIG. 1 is a view showing a configuration of a temperature adjustment control device according to a first embodiment.

Hereinafter, embodiments will be described according to the drawings. Same or equivalent portions among respective embodiments below are labeled with same reference numerals in the drawings.

First Embodiment

A first embodiment will be described. In the present embodiment, a case where the present disclosure is applied to a temperature adjustment control device to warm up a human body will be described.

As is shown in FIG. 1, the temperature adjustment control device of the present embodiment includes a temperature regulation portion 1 and a control portion 2. The temperature regulation portion 1 has a heat flux sensor 10, a panel heater 21, a cover 30, an intermediate member 40, a temperature sensor 50, and so on.

Figure 2:
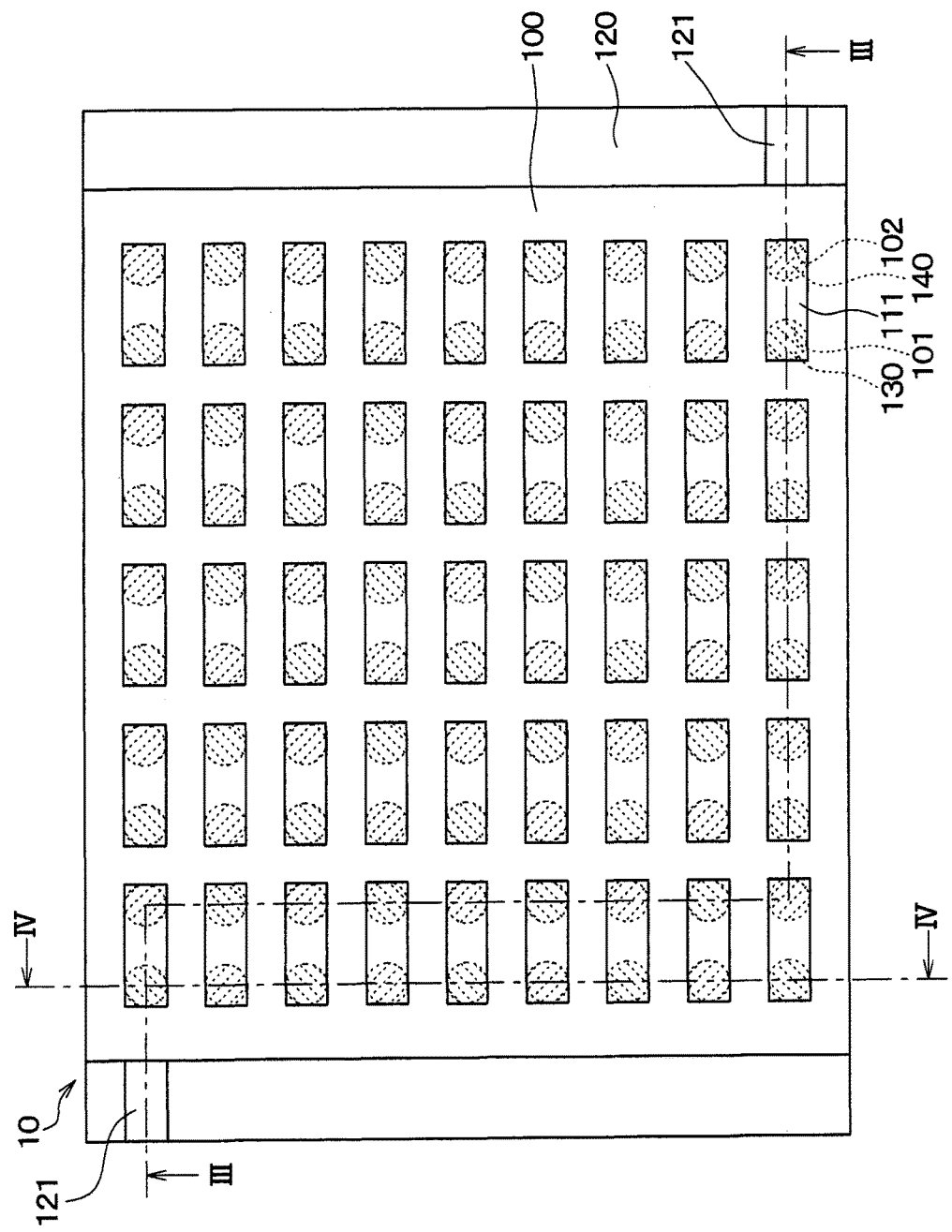
FIG. 2 is a top view of a heat flux sensor of FIG. 1.
Figure 3:
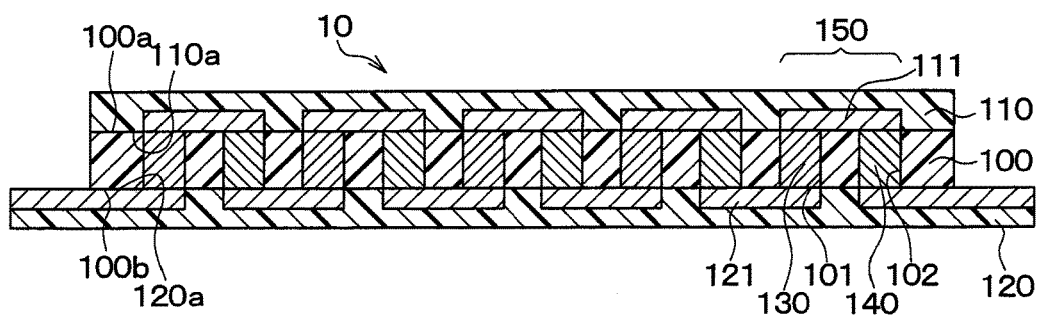
FIG. 3 is a sectional view taken along the line III-Ill of FIG. 2.
Figure 4:
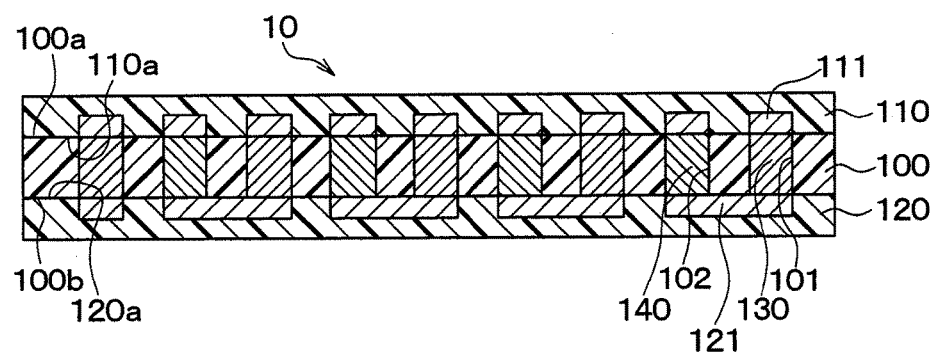
FIG. 4 is a sectional view taken along the line IV-IV of FIG. 2.

As are shown in FIG. 2 through FIG. 4, the heat flux sensor 10 is formed by combining an insulating base material 100, a surface protection member 110, and a backside protection member 120 into one unit, inside of which first interlayer connection members 130 and second interlayer connection members 140 are connected alternately in series. A structure of the heat flux sensor 10 will now be described specifically. The surface protection member 110 is omitted in FIG. 2 for ease of understanding.

In the present embodiment, the insulating base material 100 is formed of a flat rectangular film made of thermoplastic resin represented by polyether ether ketone (PEEK), polyetherimide (PEI), and a liquid crystal polymer (LCP). Multiple first via holes 101 and multiple second via holes 102 each passing through the insulating base material 100 in a thickness direction are provided alternately in a zigzag pattern.

In the present embodiment, the first via holes 101 and the second via holes 102 are shaped like a circular cylinder having a constant diameter from a surface 100a to a back surface 100b. However, the first via holes 101 and the second via holes 102 may be tapered to become smaller in diameter from the surface 100a to the back surface 100b or conversely to become smaller in diameter from the back surface 100b to the surface 100a. Further, the first via holes 101 and the second via holes 102 may be shaped like a rectangular cylinder.

The first interlayer connection member 130 is disposed in the first via hole 101, and the second interlayer connection member 140 is disposed in the second via hole 102. In other words, the insulating base material 100 is provided with the first interlayer connection members 130 and the second interlayer connection members 140 disposed alternately.

The first interlayer connection member 130 and the second interlayer connection member 140 are made of different metals so as to give rise to the Seebeck effect. For example, the first interlayer connection members 130 are made of a metallic compound (sintered alloy) prepared by applying solid-state sintering to powder of Bi—Sb—Te alloy forming a P-type member for multiple metal atoms to maintain a crystal structure before sintering. The second interlayer connection members 140 are made of a metallic compound (sintered alloy) prepared by applying solid-state sintering to powder of Bi—Te alloy forming an N-type member for multiple metal atoms to maintain a predetermined crystal structure before sintering. An electromotive force (electromotive voltage) can be increased by using the first interlayer connection members 130 and the second interlayer connection members 140 each made of a metallic compound prepared by solid-state sintering to maintain a predetermined crystal structure.

FIG. 2 is not a sectional view. However, for ease of understanding, the first interlayer connection members 130 and the second interlayer connection members 140 are shaded in different manners.

The surface protection member 110 formed of a flat rectangular film made of thermoplastic resin represented by polyether ether ketone (PEEK), polyetherimide (PEI), and a liquid crystal polymer (LCP) is disposed on the surface 100a of the insulating base material 100. The surface protection member 110 is as large as the insulating base material 100 in a flat shape and is provided with multiple surface patterns 111 spaced apart from one another, such as patterned copper foil, on one surface 110a opposing the insulating base material 100. The respective surface patterns 111 are electrically connected to the first interlayer connection members 130 and the second interlayer connection members 140 in an appropriate manner.

More specifically, as is shown in FIG. 3, given that one first interlayer connection member 130 and one second interlayer connection member 140 disposed next to each other form a set 150. Then, the first interlayer connection member 130 and the second interlayer connection member 140 forming each set 150 are connected to a same surface pattern 111. In short, the first interlayer connection member 130 and the second interlayer connection member 140 forming each set 150 are electrically connected to each other via the surface pattern 111. In the present embodiment, one first interlayer connection member 130 and one second interlayer connection member 140 disposed next to each other along a longitudinal direction of the insulating base material 100 (right-left direction on the sheet surface of FIG. 3) form one set 150.

The backside protection member 120 formed of a flat rectangular film made of thermoplastic resin represented by polyether ether ketone (PEEK), polyetherimide (PEI), and a liquid crystal polymer (LCP) is disposed on the back surface 100b of the insulating base material 100. The backside protection member 120 is longer than the insulating base material 100 in the longitudinal direction of the insulating base material 100 and disposed on the back surface 100b of the insulating base material 100 in such a manner that both ends in the longitudinal direction protrude from the insulating base material 100.

The backside protection member 120 is provided with multiple backside patterns 121 spaced apart from one another, such as patterned copper foil, on one surface 120a opposing the insulating base material 100. The respective backside patterns 121 are electrically connected to the first interlayer connection members 130 and the second interlayer connection members 140 in an appropriate manner.

More specifically, as is shown in FIG. 3, in two sets 150 situated next to each other in the longitudinal direction of the insulating base material 100, the first interlayer connection member 130 in one set 150 and the second interlayer connection member 140 in the other set 150 are connected to a same backside pattern 121. In short, the first interlayer connection member 130 in one set 150 and the second interlayer connection member 140 in another adjacent set 150 are electrically connected to each other via the same backside pattern 121.

As is shown in FIG. 4, at an outer rim of the insulating base material 100, the first interlayer connection member 130 and the second interlayer connection member 140 disposed next to each other along a direction (top-bottom direction on the sheet surface of FIG. 2) orthogonal to the longitudinal direction are connected to a same backside pattern 121. More specifically, the first interlayer connection member 130 and the second interlayer connection member 140 disposed next to each other are connected to the same backside pattern 121 to fold back the first interlayer connection members 130 and the second interlayer connection members 140 connected in series via the surface patterns 111 and the backside patterns 121 in the longitudinal direction of the insulating base material 100.

As are shown in FIG. 2 and FIG. 3, portions of the backside patterns 121 forming ends of the serial connection are exposed from the insulating base material 100. The portions of the backside patterns 121 exposed from the insulating base material 100 form portions functioning as terminals to be connected to the control portion 2.

The above has described a basic configuration of the heat flux sensor 10 in the present embodiment. The heat flux sensor 10 configured as above outputs a sensor signal (electromotive force) corresponding to a heat flux passing through the heat flux sensor 10 in the thickness direction to the control portion 2. A sensor signal is outputted because an electromotive force generated at the first interlayer connection members 130 and the second interlayer connection members 140 connected alternately in series varies in response to a variance of the heat flux. The thickness direction of the heat flux sensor 10 means a lamination direction of the insulating base material 100, the surface protection member 110, and the backside protection member 120.

A manufacturing method of the heat flux sensor 10 will now be described with reference to FIG. 5.

Figure 5:
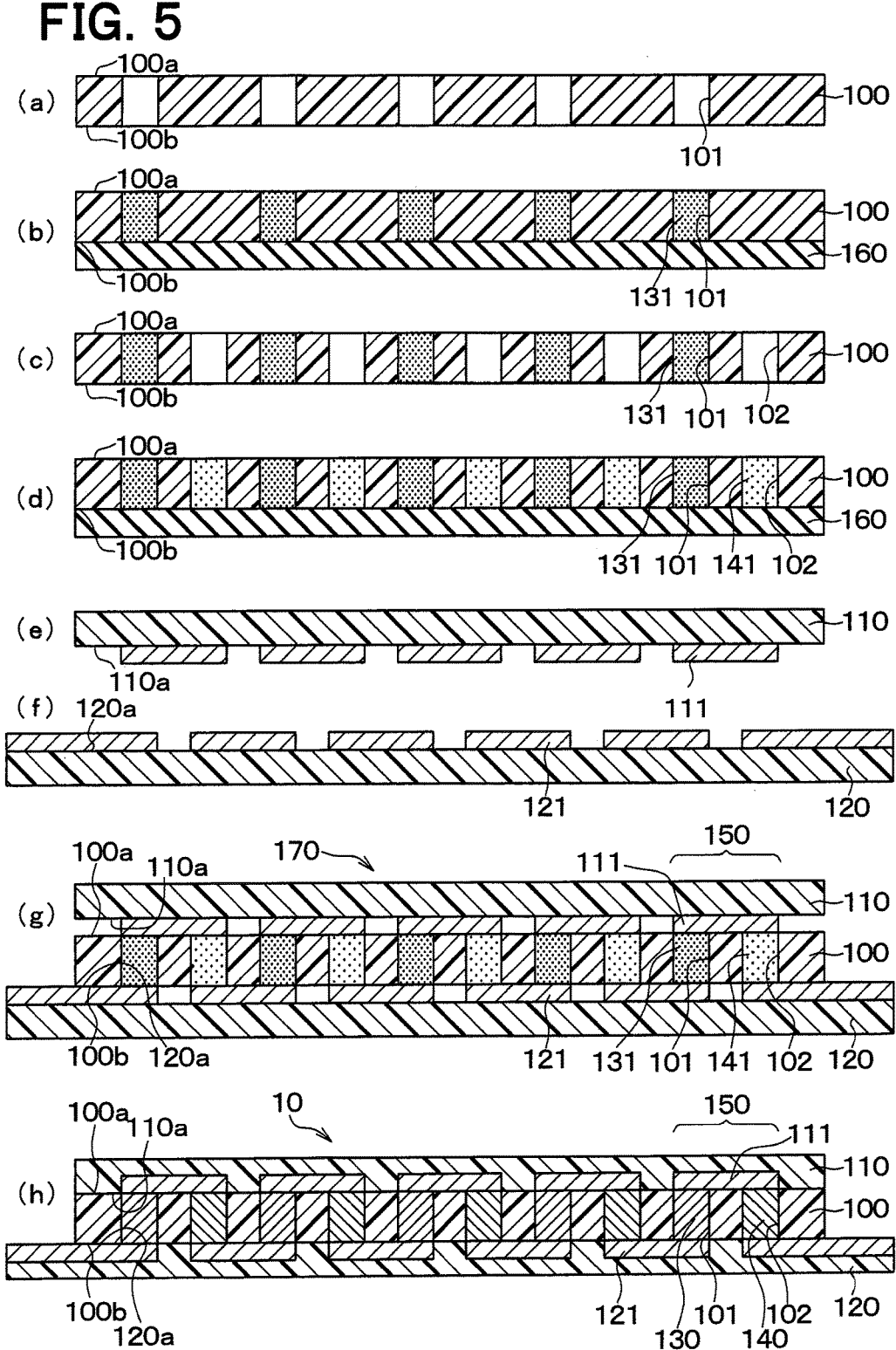
FIG. 5 is a sectional view showing a fabrication sequence of the heat flux sensor.

As is shown in (a) of FIG. 5, firstly, the insulating base material 100 is prepared and the multiple first via holes 101 are made through the insulating base material 100 with a drill or a laser beam.

In subsequent, as shown in (b) of FIG. 5, the respective first via holes 101 are filled with first conductive paste 131. Herein, a method (device) described in Japanese Patent Application No. 2010-50356 (JP 2011-187619 A) filed by the applicant of the present application may be adopted as a method (device) of filling the first via holes 101 with the first conductive paste 131.

To describe the method (device) briefly, the insulating base material 100 is placed on an unillustrated holding table via absorbent paper 160 with the back surface 100b opposed to the absorbent paper 160. The first conductive paste 131 is melted and the first via holes 101 are filled with the first conductive paste 131. Consequently, most of an organic solvent in the first conductive paste 131 is absorbed into the absorbent paper 160 and compacted powder of alloy is left in the first via holes 101.

The absorbent paper 160 can be made of any material capable of absorbing the organic solvent in the first conductive paste 131 and typical high-quality paper or the like is used. The first conductive paste 131 is paste prepared by adding an organic solvent, such as paraffin melting at 43° C., to powder of Bi—Sb—Te alloy in which metal atoms maintain a predetermined crystal structure. Hence, the surface 100a of the insulating base material 100 is heated to about 43° C. when the first via holes 101 are filled with the first conductive paste 131.

In subsequent, as shown in (c) of FIG. 5, the multiple second via holes 102 are made through the insulating base material 100 with a drill or a laser beam. As has been described above, the second via holes 102 are provided alternately with the first via holes 101 so as to form a zigzag pattern together with the first via holes 101.

In subsequent, as shown in (d) of FIG. 5, the respective second via holes 102 are filled with second conductive paste 141 in the same manner as in (b) of FIG. 5 described above.

That is to say, after the insulating base material 100 is placed again on the unillustrated holding table via the absorbent paper 160 with the back surface 100b opposed to the absorbent paper 160, the second via holes 102 are filled with the second conductive paste 141. Consequently, most of an organic solvent in the second conductive paste 141 is absorbed into the absorbent paper 160 and compacted powder of alloy is left in the second via holes 102.

The second conductive paste 141 is paste prepared by adding an organic solvent, such as turpentine melting at normal temperature, to powder of Bi—Te alloy in which metal atoms maintain a predetermined crystal structure different from the crystal structure maintained by the metal atoms forming the first conductive paste 131. That is to say, the organic solvent forming the second conductive paste 141 has a lower melting point than the organic solvent forming the first conductive paste 131. The surface 100a of the insulating base material 100 is maintained at normal temperature when the second via holes 102 are filled with the second conductive paste 141. In other words, the second via holes 102 are filled with the second conductive paste 141 while the organic solvent included in the first conductive paste 131 is in a solid state. Hence, the second conductive paste 141 is restricted from flowing into the first via holes 101.

Herein, "while the organic solvent included in the first conductive paste 131 is in a solid state" means a state in which the organic solvent that was not absorbed into the absorbent paper 160 in (b) of FIG. 5 and remained in the first via holes 101 is turned into solid.

Apart from (a) through (d) above, as shown in (e) and (f) of FIG. 5, copper foil or the like is provided, respectively, across one surface 110a of the surface protection member 110 and one surface 120a of the backside protection member 120, that is, one surface of each protection member opposing the insulating base material 100, and the copper foil is patterned suitably. Consequently, the surface protection member 110 provided with the multiple surface patterns 111 spaced apart from one another and the backside protection member 120 provided with the multiple backside patterns 121 spaced apart from one another are prepared.

In subsequent, as shown in (g) of FIG. 5, a laminated body 170 is formed by sequentially laminating the backside protection member 120, the insulating base material 100, and the surface protection member 110.

In the present embodiment, the backside protection member 120 is longer than the insulating base material 100 in the longitudinal direction. The backside protection member 120 is disposed for the both ends in the longitudinal direction to protrude from the insulating base material 100.

In subsequent, as shown in (h) of FIG. 5, the laminated body 170 is disposed between an unillustrated pair of pressing plates and the laminated body 170 is made into one unit with a pressure applied from both upper and lower surfaces in a lamination direction with heating in a vacuum state. More specifically, a pressure is applied to the laminated body 170 with heating to make the laminated body 170 into one unit in such a manner that solid-state sintering is applied to the first conductive paste 131 and the second conductive paste 141 to form the first interlayer connection member 130 and the second interlayer connection member 140, respectively, while the first interlayer connection member 130 and the surface patterns 111 as well as the second interlayer connection member 140 and the backside patterns 121 are connected.

Although it is not a limitation of the present disclosure, a cushion material, such as rock wool paper, may be disposed between the laminated body 170 and the pressing plates when the laminated body 170 is made into one unit. The heat flux sensor 10 is manufactured in the manner as above.

As is shown in FIG. 1, the panel heater 21 is provided with the heat flux sensor 10. In the present embodiment, the panel heater 21 uses a heating element (temperature changing body) generating heat in an amount varying with an amount of power supply from the control portion 2 and becoming hotter by generating a larger amount of heat when the amount of power supply is increased. For example, a known panel heater having a nichrome wire 21a employed as a heating element disposed like a polygonal line and stored in a protection cover (not shown) is used as the panel heater 21. The panel heater 21 becomes hot by generating heat when energized from the control portion 2.

In the present embodiment, the nichrome wire 21a corresponds to the temperature changing body. Although the protection cover is omitted in FIG. 1, the heat flux sensor 10 is disposed directly above the nichrome wire 21a. A thickness (size) of the nichrome wire 21a is constant to make an amount of heat generation equal in every local region. Herein, "a constant thickness (size) of the nichrome wire 21a" allows for a slight error due to manufacturing error. The heat flux sensor 10 is disposed with the backside protection member 120 on a side of the panel heater 21.

The intermediate member 40 diffuses and transmits heat generated at the panel heater 21 (nichrome wire 21a) and is disposed so as to cover a portion of the heat flux sensor 10 not in contact with the panel heater 21 and a portion of the panel heater 21 on a side where the heat flux sensor 10 is disposed. More specifically, because the heat flux sensor 10 is in contact with the panel heater 21 across one surface on an opposite side to the one surface 120a of the backside protection member 120, the intermediate member 40 is disposed so as to cover a portion of the heat flux sensor 10 not in contact with the panel heater 21 and a portion of the panel heater 21 not in contact with the heat flux sensor 10 on the side where the heat flux sensor 10 is disposed. In other words, the intermediate member 40 is disposed so as to cover a portion (one surface) of the heat flux sensor 10 on the opposite side to the panel heater 21, a portion (side surfaces) connecting the portion on the opposite side specified as above and a portion in contact with the panel heater 21, and a portion of the panel heater 21 not in contact with the heat flux sensor 10 on the side where the thermal flux sensor 10 is disposed. Consequently, heat generated at the panel heater 21 (nichrome wire 21a) is diffused uniformly by the intermediate member 40. While the panel heater 21 has the nichrome wire 21a disposed inside, the nichrome wire 21a is disposed like a polygonal line, and spaces (portions where no heat is generated) are formed among folds of the nichrome wire 21a. Hence, by disposing the intermediate member 40 as described above, heat generated at the nichrome wire 21a can be diffused uniformly. In the present embodiment, the intermediate member 40 corresponds to a heat diffusion layer and is made of a high heat diffusion material, such as stainless or resin.

The cover 30 is disposed over the intermediate member 40. In the present embodiment, the cover 30 is also made of a high heat diffusion material, such as stainless or resin. The cover 30 is, however, an optional member.

The temperature sensor 50 outputs a detection signal indicating a measured temperature of a surface 200a described below to the control portion 2 and can be, for example, a thermistor.

The control portion 2 includes a CPU, various memories making up storage means, peripheral devices, and so on, and is connected to the heat flux sensor 10, the panel heater 21, the temperature sensor 50, and so on. The control portion 2 controls power supply to the panel heater 21 on the basis of a sensor signal inputted from the heat flux sensor 10 and a detection signal inputted from the temperature sensor 50.

Figure 6:
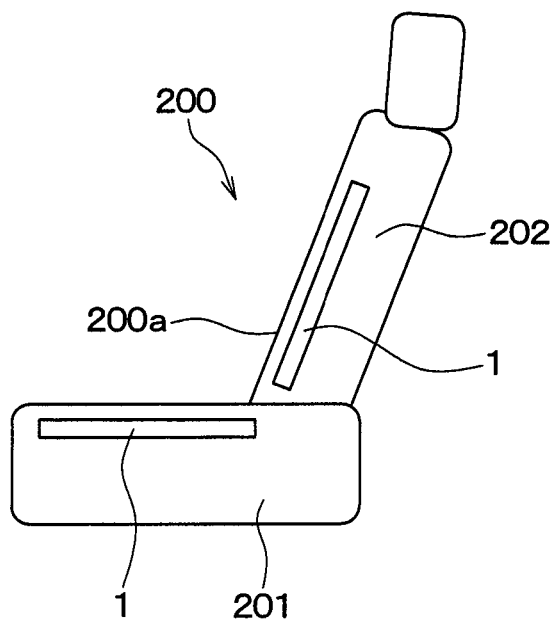
FIG. 6 is a schematic view illustrating a heater portion disposed to a seat.

The above has described the configuration of the temperature adjustment control device of the present embodiment. The temperature adjustment control device configured as above is used as a temperature adjustment control device for an electrical carpet, a seat, a toilet seat, and so on. For example, in a case where the temperature adjustment control device is used for a seat disposed in a vehicle interior of an automobile as is shown in FIG. 6, two temperature regulation portions 1 are disposed to a seat 200 including a seating face portion (seat cushion) 201 and a backrest portion (seat back) 202, one inside the seating face portion 201 and the other inside the backrest portion 202. A temperature environment a human body (occupant) feels comfortable with is presented by controlling the temperature regulation portions 1 using a vehicle ECU employed as the control portion 2.

In the temperature regulation portion 1, the cover 30, the intermediate member 40, the heat flux sensor 10, and the panel heater 21 are disposed sequentially from a side of the surface, such as a cover, making contact with the human body. That is to say, in a case where the temperature regulation portions 1 are installed to a vehicle as is shown in FIG. 6, the cover 30, the intermediate member 40, the heat flux sensor 10, and the panel heater 21 are disposed sequentially from the side of the surface 200*a*, which is a portion of the seat 200 making contact with the human body (occupant) seated on the seat 200. The heat flux sensor 10 outputs a sensor signal corresponding to a heat flux passing through the heat flux sensor 10 in a direction in which the intermediate member 40, the heat flux sensor 10, and the panel heater 21 are disposed.

An operation of the control portion 2 in the temperature adjustment control device will now be described with reference to FIG. 7. In the present embodiment, the heat flux sensor 10 outputs a negative electromotive force (sensor signal) to the control portion 2 when a heat flux directed from the surface protection member 110 toward the backside protection member 120 passes through. The control portion 2 starts the processing described below, for example, when the human body (user) gives a start instruction or switches ON an ignition switch in a case where the temperature adjustment control device is installed to a vehicle. Also, the control portion 2 receives an input of a sensor signal from the heat flux sensor 10 and an input of a detection signal from the temperature sensor 50 in every predetermined period.

As is shown in FIG. 7, a determination is made first as to whether an instruction to stop a temperature control is given (S301). When the stop instruction is given (S301: YES), the processing is ended. On the other hand, when the stop instruction is not given (S301: NO), whether a sensor signal of the heat flux sensor 10 is lower than or equal to a start threshold is determined (S302).

Although it will be described specifically below, when a human body 210 makes contact with the surface 200*a*, a heat flux directed from the human body 210 toward the surface 200*a* (heat flux sensor 10) is generated (see FIG. 8A and FIG. 8C). That is to say, a heat flux directed from the surface protection member 110 toward the backside protection member 120 passes through the heat flux sensor 10 and a negative electromotive force is generated in the heat flux sensor 10. Accordingly, by determining whether a sensor signal of the heat flux sensor 10 is lower than or equal to the start threshold, whether the human body 210 is in contact with the surface 200*a* can be determined. The start threshold is determined on the basis of a value that can be generated when the human body 210 makes contact with the surface 200*a* while power supply to the panel heater 21 is not started.

A determination as to whether the stop instruction is given in Step S301 is made by, for example, determining whether the occupant makes a stop instruction on a touch panel provided to a dashboard when the temperature adjustment control device is installed to a vehicle. Likewise, a determination as to whether a start instruction is given is made by determining whether the occupant makes a start instruction on the touch panel.

When the sensor signal of the heat flux sensor 10 is above the start threshold (S302: NO), the processing in Step S301 is performed again because the human body 210 is not in contact with the surface 200*a*. When the sensor signal of the heat flux sensor 10 is lower than or equal to the start threshold (S302: YES), because the human body 210 is in contact with the surface 200*a*, power supply to the panel heater 21 is started to let the panel heater 21 generate heat (S303). Consequently, the surface 200*a* is warmed up via the cover 30 (intermediate member 40) and so is the human body 210.

In the present embodiment, the cover 30 and the intermediate member 40 are made of a high heat diffusion material. Hence, an amount of heat transmitted from the cover 30 to the surface 200*a* becomes substantially equal in every portion. A temperature of the surface 200*a* can be thus restricted from varying from one portion to another.

After power supply to the panel heater 21 is started, whether a detection signal of the temperature sensor 50 is higher than or equal to a threshold is first determined (S304). When the detection signal is below the threshold (S304: NO), an amount of power supply to the panel heater 21 is increased (S305). A temperature of the surface 200*a* is raised to the threshold (predetermined temperature) after power supply to the panel heater 21 is started as above with the aim of shortening a time taken until the human body 210 feels comfortable.

When the detection signal of the temperature sensor 50 is higher than or equal to the threshold (S304: YES), whether the sensor signal of the heat flux sensor 10 is lower than or equal to a lower limit threshold is determined (S306). When the sensor signal of the heat flux sensor 10 is lower than or equal to the lower limit threshold (S306: YES), an amount of power supply to the panel heater 21 is increased (S307). Subsequently, the flow returns to the processing in Step S306. When the sensor signal of the heat flux sensor 10 is above the lower limit threshold (S306: NO), whether the sensor signal of the thermal flux sensor 10 is higher than or equal to an upper limit threshold is determined (S308). When the sensor signal of the heat flux sensor 10 is higher than or equal to the upper limit threshold (S308: YES), an amount of power supply to the panel heater 21 is decreased (S309) and the flow returns to the processing in Step S306.

The lower limit threshold and the upper limit threshold are preliminarily determined on the basis of a heat flux the human body 210 feels comfortable with. Hence, by repeating the processing in Steps S306 through S309 as above, a temperature control to control power supply to the panel heater 21 is performed for a heat flux between the human body 210 and the surface 200*a* (between the surface 200*a* and the panel heater 21) to be substantially constant. Consequently, a temperature environment the human body 210 feels comfortable with can be presented over a long period.

When the sensor signal of the heat flux sensor 10 is below the upper limit threshold (S308: NO), whether a variation (differential value) in the sensor signal of the heat flux sensor 10 is equal to or greater than a stop threshold is determined (S310).

Although it will be described specifically below, when the human body 210 that has been in contact with the surface 200*a* moves away from the surface 200*a*, a heat flux between the human body 210 and the surface 200*a* varies considerably and a variation in the sensor signal of the heat flux sensor 10 takes a negative value (see FIG. 8B and FIG. 8C). Hence, by determining whether a variation in the sensor signal of the heat flux sensor 10 is equal to or less than the stop threshold, whether the human body 210 is in contact with the surface 200*a* can be determined. The stop threshold is determined on the basis of a value that can be generated when the human body 210 moves away from the surface 200*a*.

Accordingly, when a variation in the sensor signal of the heat flux sensor 10 is greater than the stop threshold (S310: NO), the flow returns to the processing in Step S306 because the human body 210 remains in contact with the surface 200*a*. When a variation in the sensor signal of the heat flux sensor 10 is equal to or less than the stop threshold (S310: YES), because the human body 210 moves away from the surface 200*a*, power supply to the panel heater 21 is stopped and the processing is ended (S311).

The control portion 2 in the present embodiment operates as above. When a determination is made on the sensor signal of the heat flux sensor 10 in the processing in Steps S302, S306, and S308 and when a variation in the sensor signal of the heat flux sensor 10 is determined in the processing in Step S310, a determination may be made using a value converted from the sensor signal to a heat flux instead of making a determination on the sensor signal (electromotive force) outputted from the heat flux sensor 10.

A relation between an actual heat flux and a time will now be described with reference to FIG. 7 and FIG. 8A through FIG. 8C. In FIG. 8A through FIG. 8C, time points T0 through T5 are common. FIG. 8C is a schematic view showing a heat flux related with the heat flux sensor 10, the panel heater 21, the surface 200a, and the human body 210. In FIG. 8C, a temperature of an outside space is about 18° C., ON shows a state in which the panel heater 21 is energized, OFF shows a state in which the panel heater 21 is not energized, and arrows indicate magnitude and a direction of a heat flux.

Figure 8B:
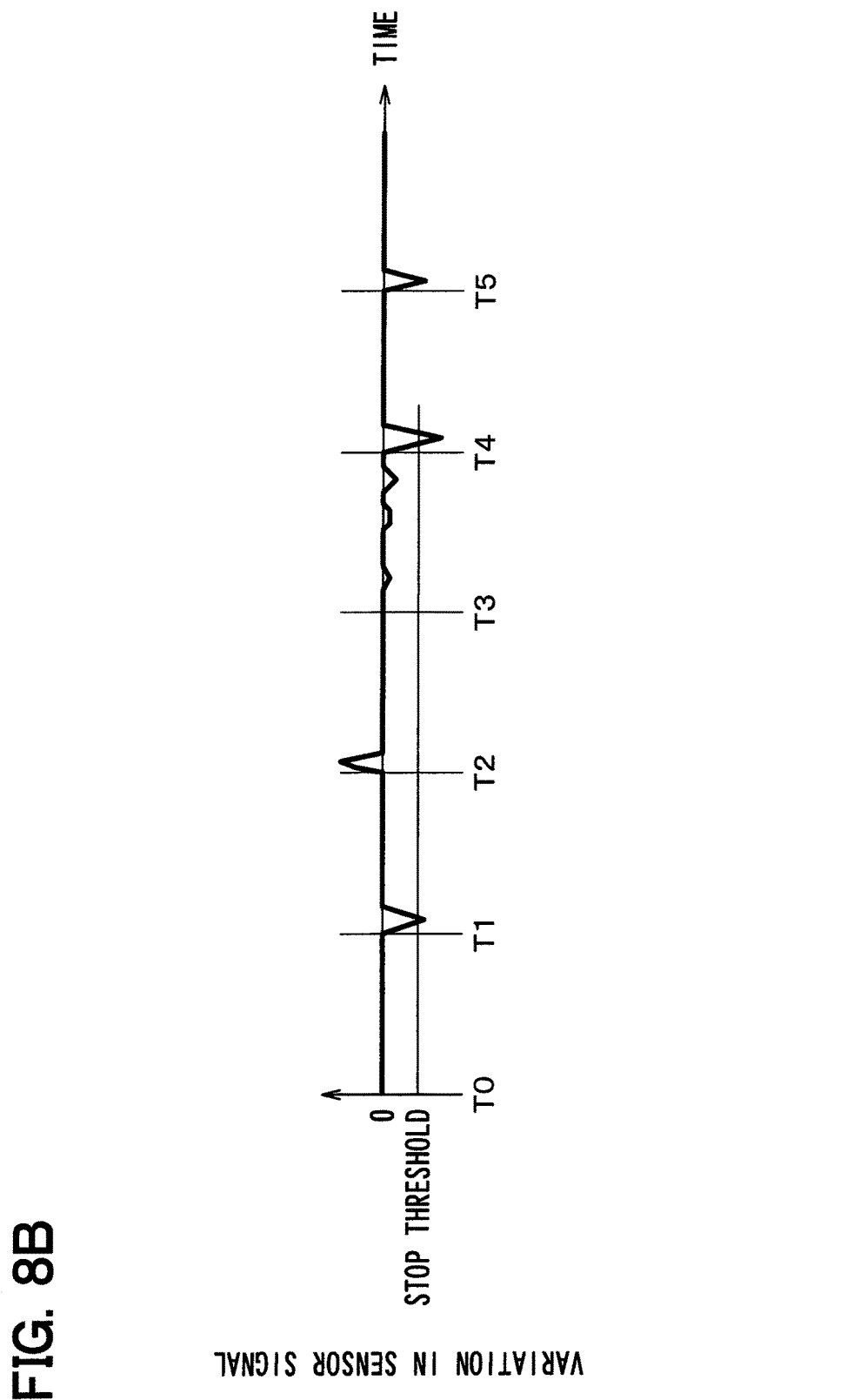
FIG. 8B is a timing chart showing a relation between a variation in the sensor signal and a time.
Figure 8C:
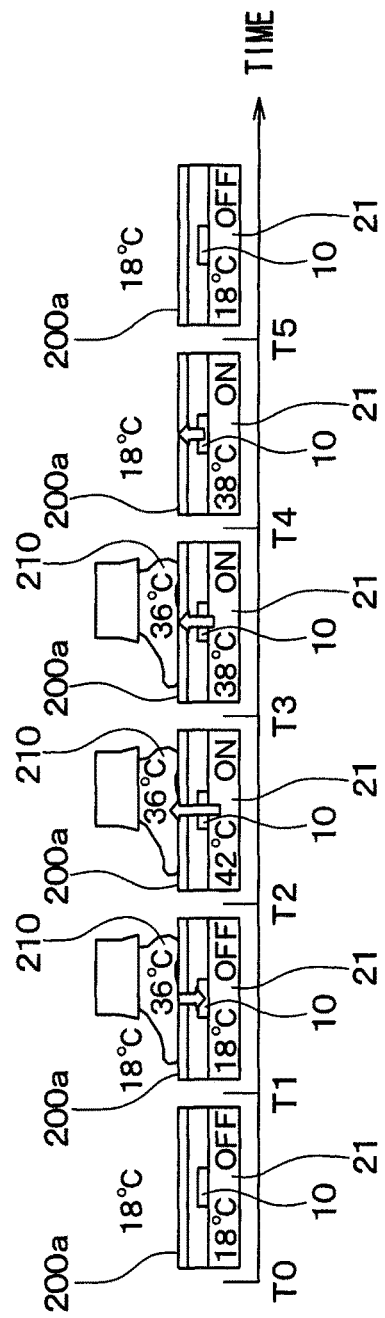
FIG. 8C is a timing chart showing a relation between a heat flux and a time.

A period from a time point T0 to a time point T1 in FIG. 8C is a case where the human body 210 is not in contact with the surface 200a and hence the panel heater 21 is not energized. In such a case, a temperature of the panel heater 21 is also about 18° C. Accordingly, as is shown in FIG. 8A, a sensor signal outputted from the heat flux sensor 10 is substantially 0.

When the human body 210 makes contact with the surface 200a at the time point T1 in FIG. 8C, because a temperature of the human body 210 is about 36° C., a heat flux directed from the human body 210 toward the heat flux sensor 10 is generated. Hence, as is shown in FIG. 8A, a sensor signal corresponding to the heat flux is outputted from the heat flux sensor 10. Accordingly, the control portion 2 determines whether the human body 210 is in contact with the surface 200a by determining whether the sensor signal of the heat flux sensor 10 is lower than or equal to the start threshold (S302).

When it is determined that the human body 210 is in contact with the surface 200a (S302: YES), the control portion 2 starts power supply to the panel heater 21 at a time point T2 (S303). Accordingly, the surface 200a is warmed up by heat released from the panel heater 21 and the surface 200a becomes hot. Hence, as is shown in FIG. 8C, a heat flux directed from the surface 200a toward the human body 210 is generated.

In the present embodiment, as has been described in Steps S304 and S305 above, the panel heater 21 is energized to raise a temperature of the surface 200a to or above the threshold (predetermined temperature) before the temperature control is performed to make a heat flux between the surface 200a and the human body 210 constant. In the present embodiment, the panel heater 21 is energized to raise a temperature of the surface 200a to about 42° C. Hence, as is shown in FIG. 8A, the sensor signal of the heat flux sensor 10 is above the upper limit threshold in a period from the time point T2 to a time point T3.

In a period from the time point T3 to a time point T4, the control portion 2 maintains a heat flux between the human body 210 and the surface 200a (panel heater 21) substantially constant as are shown in FIG. 8A and FIG. 8C by adequately increasing and decreasing an amount of power supply to the panel heater 21 (S306 through S309). In FIG. 8C, a temperature of the panel heater 21 is 38° C. However, a temperature of the panel heater 21 actually rises and drops depending on a temperature of the human body.

Subsequently, when the human body 210 moves away from the surface 200a at the time point T4 as is shown in FIG. 8C, the sensor signal drops as is shown in FIG. 8A and a variation (differential value) in the sensor signal of the heat flux sensor 10 decreases steeply (takes a negative value) as is shown in FIG. 8B. In other words, an absolute value of a variation in the sensor signal of the heat flux sensor 10 increases steeply. Hence, the control portion 2 determines whether the human body 210 is in contact with the surface 200a by determining whether a variation in the sensor signal is equal to or less than the stop threshold (S310).

When it is determined that the human body 210 moves away from the surface 200a (S310: YES), the control portion 2 stops power supply to the panel heater 21 at a time point T5 and ends the processing (S311).

As has been described, because a heat flux is generated whenever the human body 210 makes contact with the surface 200a or the human body 210 moves away from the surface 200a, power supply to the panel heater 21 is controlled on the basis of the heat flux in the present embodiment. The heat flux depends on whether the human body 210 is in contact with the surface 200a and does not depend on a motion speed of the human body 210. Hence, power supply to the panel heater 21 can be started and stopped more accurately.

In the present embodiment, the temperature regulation portion 1 can be restricted from becoming an obstacle to the human body 210. That is to say, in a temperature adjustment control device in the related art, a human body is detected using a pyroelectric sensor and the pyroelectric sensor has to be disposed outside the surface 200a. Accordingly, the pyroelectric sensor may possibly become an obstacle to the human body 210. In contrast, the temperature regulation portion 1 of the present embodiment is disposed, for example, as is shown in FIG. 6, between the surface 200a making contact with the human body 210 and the panel heater 21. Hence, the temperature regulation portion 1 can be restricted from becoming an obstacle to the human body 210.

In the present embodiment, power supply to the panel heater 21 is controlled to make a heat flux between the human body 210 and the surface 200a constant (S306 through S309). Hence, a heat flux between the human body 210 and the surface 200a can be maintained at a value the human body 210 feels comfortable with. Consequently, a temperature environment the human body 210 feels comfortable with can be presented over a long period.

In the present embodiment, a temperature of the surface 200a is raised to or above the threshold (predetermined temperature) before the temperature control is performed to make a heat flux between the human body 210 and the surface 200a constant. Hence, a time taken until the human body 210 feels comfortable can be shortened. That is to say, for example, in a case where power supply to the panel heater 21 is started when a body surface temperature of the human body 210 is as low as about 20° C. without raising a temperature of the surface 200a as above, power supply to the panel heater 21 is controlled to make a heat flux between the human body 210 and the surface 200a constant while the body surface temperature of the human body 210 is low. In short, an amount of power supply to the panel heater 21 is not increased for a while even when the human body 210 feels cold. An amount of power supply to the panel heater 21 is increased eventually as the body surface temperature of the human body 210 becomes higher and a temperature environment the human body 210 feels comfortable with can be presented in the end. However, it takes a long time to present a comfortable temperature environment. Hence, by raising a temperature of the surface 200a to the threshold (predetermined temperature) before the temperature control is performed to make a heat flux between the human body 210 and the surface 200a constant, a time taken until the human body 210 feels comfortable can be shortened.

In the present embodiment, because the nichrome wire 21a has a constant thickness (size), an amount of heat generated in any local spot of the nichrome wire 21a can be constant. The intermediate member 40 is disposed so as to cover a portion of the heat flux sensor 10 not in contact with the panel heater 21 and a portion of the panel heater 21 not in contact with the heat flux sensor 10 on the side where the heat flux sensor 10 is disposed. Hence, a temperature of the surface 200a making contact with the human body can be restricted from varying from one portion to another. Consequently, an uncomfortable feeling the human body may have can be lessened.

The cover 30 and the intermediate member 40 are made of a high heat diffusion material, such as stainless and resin. Hence, a temperature of the surface 200a can be further restricted from varying from one portion to another.

Second Embodiment

A second embodiment will be described. In the present embodiment, a temperature changing body is changed from the temperature changing body of the first embodiment above. Because the rest is same as the first embodiment above, a description of the same configuration is not repeated herein.

The present embodiment is a case where the present disclosure is applied to a temperature adjustment control device to cool a human body 210. A temperature changing body used herein is a Peltier element that becomes cold on a side of the heat flux sensor 10 and hot on an opposite side to the heat flux sensor 10 when energized. The Peltier element becomes colder on the side of the heat flux sensor 10 as an amount of energization from a control portion 2 is increased.

Figure 9:
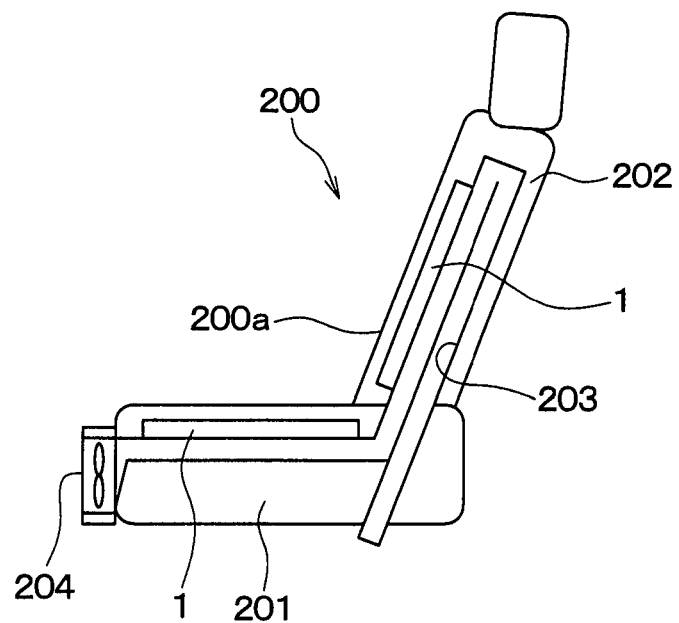
FIG. 9 is a schematic view illustrating a heater portion disposed to a seat in a second embodiment.

In a case where the temperature adjustment control device as above is used as a temperature adjustment control device for a seat 200 installed to a vehicle as is shown in FIG. 9, two temperature regulation portions 1 are provided as with the case of FIG. 6. A heat exhaust passage 203 is provided inside the seat 200 and a fan 204 to exhaust air from the heat exhaust passage 203 is provided to the seat 200. In short, the temperature adjustment control device is used in a configuration capable of releasing heat generated at the Peltier element through the heat exhaust passage 203.

When heat is released through the heat exhaust passage 203, heat may be released to an outside of the vehicle or released into the vehicle and recycled to regulate an internal temperature of the vehicle using a car air-conditioning device or the like.

An operation of the control portion 2 of the temperature adjustment control device as above will now be described with reference to FIG. 10. The operation is basically same as the operation described as above with reference to FIG. 7 and chiefly a difference will be described.

Firstly, Steps (S401 and S402) are performed in the same manner as in Steps S301 and S302 above. When a sensor signal of the heat flux sensor 10 is lower than or equal to a start threshold (S402: YES), power supply to the Peltier element is started (S403). Consequently, a surface 200a is cooled via a cover 30 (intermediate member 40) and so is the human body 210.

Subsequently, Steps (S404 and S405) are performed in the same manner as in Steps S304 and S305 above. When a detection signal of a temperature sensor 50 is above a threshold (S404: NO), an amount of power supply to the Peltier element is increased (S405). A temperature of the surface 200a is lowered to the threshold (predetermined temperature) after power supply to the Peltier element is started as above with the aim of shortening a time taken until the human body 210 feels comfortable. In the present embodiment, whether the detection signal is lower than or equal to the threshold is determined because the surface 200a is cooled by the Peltier element.

Subsequently, Steps (S406 through S409) are performed in the same manner as in Steps S306 through S309 above. When the sensor signal of the heat flux sensor 10 is higher than or equal to the threshold (S406: YES), an amount of power supply to the Peltier element is increased (S407). When the sensor signal of the heat flux sensor 10 is lower than or equal to a lower limit threshold (S408: YES), an amount of power supply to the Peltier element is decreased (S409).

The upper limit threshold and the lower limit threshold are preliminarily determined on the basis of a heat flux the human body 210 feels comfortable with. Hence, by repeating the processing in Steps S406 through S409 as above, a temperature control to control power supply to the Peltier element is performed for a heat flux between the human body 210 and the surface 200a to be substantially constant. Consequently, a temperature environment the human body 210 feels comfortable with can be presented over a long period.

When the sensor signal of the heat flux sensor 10 is above the lower limit threshold (S408: NO) and a variation (differential value) in the sensor signal of the heat flux sensor 10 is equal to or greater than a stop threshold (S410: YES), power supply to the Peltier element is stopped and the processing is ended (S411).

Although it will be described specifically below, a heat flux between the surface 200a and the human body 210 varies considerably when the human body 210 that has been in contact with the surface 200a moves away from the surface 200a. Because the surface 200a is cooled by the Peltier element in the present embodiment, a variation in the sensor signal of the heat flux sensor 10 takes a positive value (see FIG. 11B and FIG. 11C) when the human body 210 moves away from the surface 200a. Hence, by determining whether a variation in the sensor signal of the heat flux sensor 10 is equal to or greater than the stop threshold, whether the human body 210 is in contact with the surface 200a can be determined. The stop threshold is determined on the basis of a value that can be generated when the human body 210 moves away from the surface 200a.

Figure 11A:
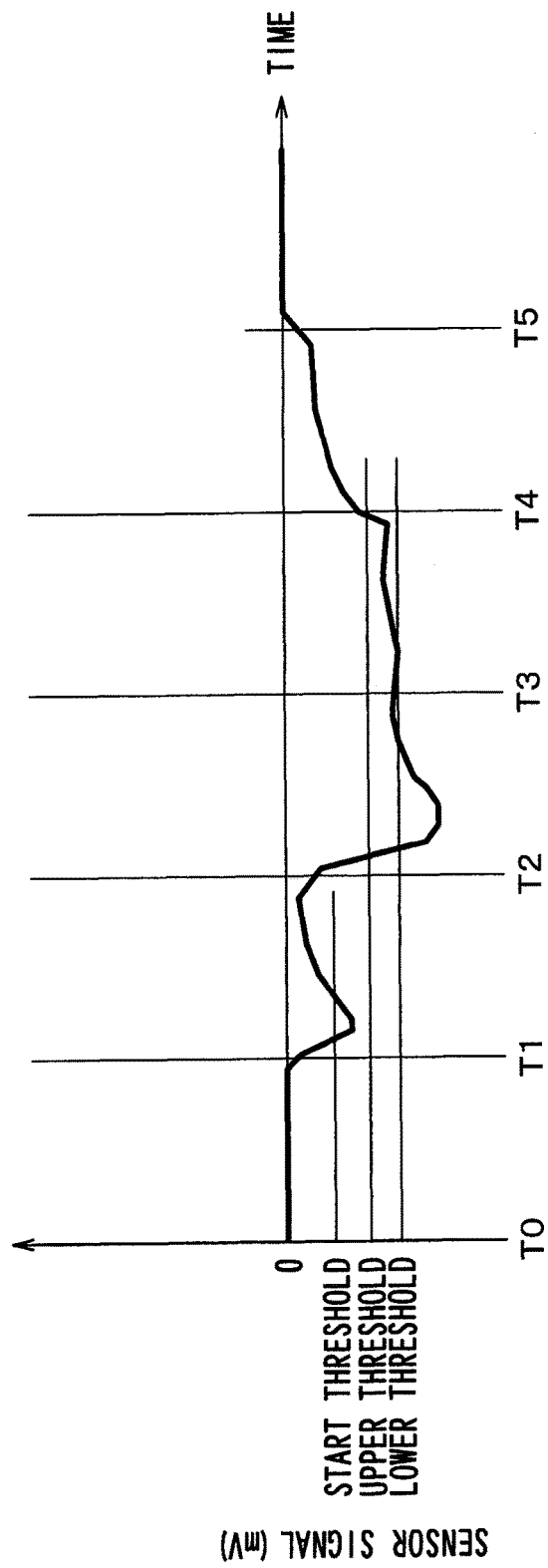
FIG. 11A is a timing chart showing a relation between a sensor signal and a time.
Figure 11B:
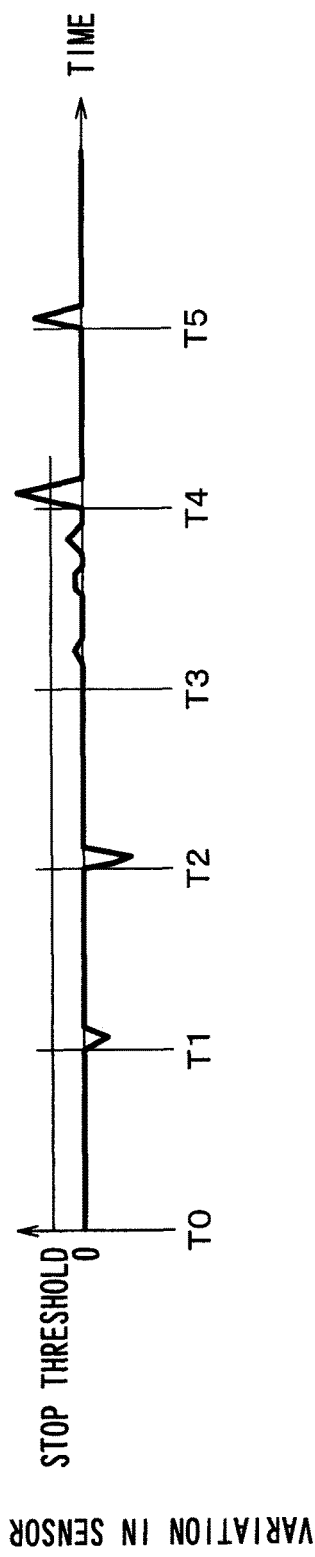
FIG. 11B is a timing chart showing a relation between a variation in the sensor signal and a time.

The control portion 2 of the present embodiment operates as above. A relation between a heat flux and a time of the present embodiment will now be described with reference to FIG. 10 and FIG. 11A through FIG. 11C. In FIG. 11A through FIG. 11C, time points T0 through T5 are common. FIG. 11C is a schematic view showing a heat flux related with the heat flux sensor 10, the Peltier element 22, the surface 200a, and the human body 210. In FIG. 11C, a temperature of an outside space is about 30° C., ON shows a state in which the Peltier element 22 is energized, OFF shows a state in which the Peltier element 22 is not energized, and arrows indicate magnitude and a direction of a heat flux.

A period from a time point T0 to a time point T1 in FIG. 11C is a case where the human body 210 is not in contact with the surface 200a and hence the Peltier element 22 is not energized. In such a case, a temperature of the Peltier element 22 is also about 30° C. Accordingly, as is shown in FIG. 11A, a sensor signal outputted from the heat flux sensor 10 is substantially 0.

When the human body 210 makes contact with the surface 200a at the time point T1 in FIG. 11C, because a temperature of the human body 210 is about 36° C., a heat flux directed from the human body 210 toward the heat flux sensor 10 is generated. Hence, as is shown in FIG. 11A, a sensor signal corresponding to the heat flux is outputted from the heat flux sensor 10. Accordingly, the control portion 2 determines whether the human body 210 is in contact with the surface 200a by determining whether the sensor signal of the heat flux sensor 10 is lower than or equal to the start threshold (S402).

When it is determined that the human body 210 is in contact with the surface 200a (S402: YES), the control portion 2 starts power supply to the Peltier element 22 at a time point T2 (S403). Accordingly, the surface 200a is cooled by the Peltier element 22 and the surface 200a becomes cold. Hence, as is shown in FIG. 11C, the heat flux directed from the human body 210 toward the heat flux sensor 10 is increased.

In the present embodiment, as has been described in Steps S404 and S405 above, the Peltier element 22 is energized to lower a temperature of the surface 200a to or below the threshold before the temperature control is performed to make a heat flux between the surface 200a and the human body 210 constant. In the present embodiment, the Peltier element 22 is energized to decrease a temperature of the cooled portion to about 23° C. Hence, as is shown in FIG. 11A, the sensor signal of the heat flux sensor 10 is below the lower limit threshold in a period from the time point T2 to a time point T3.

In a period from the time point T3 to a time point T4, the control portion 2 maintains a heat flux between the human body 210 and the surface 200a (Peltier element 22) substantially constant as are shown in FIG. 11A and FIG. 11C by adequately increasing and decreasing an amount of power supply to the Peltier element 22 (S406 through S409). In FIG. 11C, a temperature of the Peltier element 22 is 26° C. However, a temperature of the Peltier element 22 actually rises and drops depending on a temperature of the human body 210.

Subsequently, when the human body 210 moves away from the surface 200a at the time point T4 as is shown in FIG. 11C, the sensor signal drops to substantially 0 as is shown in FIG. 11A and a variation in the sensor signal of the heat flux sensor 10 increases steeply (takes a positive value) as is shown in FIG. 11B. Hence, the control portion 2 determines whether the human body 210 is in contact with the surface 200a by determining whether a variation in the sensor signal is equal to or greater than the stop threshold (S410).

When it is determined that the human body 210 moves away from the surface 200a (S410: YES), the control portion 2 stops power supply to the Peltier element 22 at a time point T5 and ends the processing (S411).

As has been described, even when the present disclosure is applied to the temperature adjustment control device to cool the human body 210, effects same as the effects obtained in the first embodiment above can be also achieved.

Other Embodiments

It should be appreciated that the present disclosure is not limited to the embodiments above and can be modified as needed within the scope of the appended claims.

For example, the heat flux sensor 10 may have the surface protection member 110 disposed on the temperature changing body side in the respective embodiments above. In such a case, positive and negative signs of a sensor signal outputted from the heat flux sensor 10 are inverted. For example, when the human body 210 makes contact with the surface 200a at the time T1, a positive electromotive force is outputted as the sensor signal.

Hence, when the heat flux sensor 10 is disposed as in the modification above, for example, the start threshold is also set to a positive value. The control portion 2 starts power supply to the temperature changing body (nichrome wire 21a or Peltier element 22) in Step S302 or Step S402 when the sensor signal of the heat flux sensor 10 is higher than or equal to the start threshold. That is to say, a determination is made in Step S302 and Step S402 on the basis of an absolute value of the sensor signal and an absolute value of the start threshold and energization is started when the absolute value of the sensor signal becomes equal to or greater than the absolute value of the start threshold. Likewise, a determination is made in Step S310 and Step S410 on the basis of an absolute value of a variation in the sensor signal and an absolute value of the stop threshold and energization is stopped when the absolute value of a variation in the sensor signal becomes equal to or greater than the absolute value of the stop threshold.

In the first embodiment above, the processing in Steps S304 and S305 may not be performed and the processing in Steps S306 through S309 may not be performed, either. Even when the temperature adjustment control device is configured as such, power supply to the panel heater 21 can be controlled more accurately by regulating energization of the panel heater 21 on the basis of a heat flux between the human body 210 and the surface 200a. Likewise, the processing in Steps S404 through S409 may not be performed in the second embodiment above.

In the first embodiment above, the processing in Step S302 may be performed in the same manner as with the processing in Step S310 by making a determination on the basis of a variation in the sensor signal and the start threshold. Also, in the second embodiment above, the processing in Step S402 may be performed in the same manner as with the processing in Step S410 by making a determination on the basis of a variation in the sensor signal and the start threshold.

Further, a determination in S310 may be made before the temperature control in Steps S306 through S309 is performed in the first embodiment above. Likewise, a determination in S410 may be made before the temperature control in Steps S406 through S409 is performed in the second embodiment above.

What is claimed is:
1. A temperature adjustment control device comprising:
a temperature changing body having a temperature changed when energized;
a heat flux sensor disposed on the temperature changing body and outputting a sensor signal corresponding to a heat flux;
a heat diffusion layer disposed on a side opposite to the temperature changing body through the heat flux sensor so as to cover the heat flux sensor; and
a control portion that controls the temperature of the temperature changing body by controlling a power supply to the temperature changing body, wherein:
the heat diffusion layer, the heat flux sensor, and the temperature changing body are arranged sequentially from a surface making contact with a human body;

the heat flux sensor outputs the sensor signal corresponding to the heat flux passing through the heat flux sensor in a direction in which the heat diffusion layer, the heat flux sensor, and the temperature changing body are arranged; and the control portion controls a start and a stop of the power supply to the temperature changing body based on the sensor signal outputted from the heat flux sensor.

2. The temperature adjustment control device according to claim 1, wherein:

the control portion starts the power supply to the temperature changing body when an absolute value of the sensor signal outputted from the heat flux sensor is greater than or equal to a start threshold; and the control portion stops the power supply to the temperature changing body when an absolute value of a variation in the sensor signal is greater than or equal to a stop threshold after the power supply to the temperature changing body is started.

3. The temperature adjustment control device according to claim 1, wherein:

the control portion performs a temperature control to regulate the power supply to the temperature changing body such that a heat flux between the surface and the temperature changing body becomes constant after the power supply to the temperature changing body is started.

4. The temperature adjustment control device according to claim 3, further comprising:

a temperature sensor outputting a detection signal corresponding to a temperature of the surface, wherein the control portion regulates an amount of the power supply to the temperature changing body such that the temperature of the surface becomes a predetermined temperature based on the detection signal output from the temperature sensor after the power supply to the temperature changing body is started and before the temperature control is performed.

5. The temperature adjustment control device according to claim 1, wherein:

the heat flux sensor includes an insulting base material made of thermoplastic resin, first and second via holes alternately passing through the insulating base material in a thickness direction, and first and second interlayer connection members made of metals different from each other and filled into the first and second via holes, respectively; and the first and second interlayer connection members are connected alternately in series.

6. The temperature adjustment control device according to claim 5, wherein:

the metal making at least one of the first and second interlayer connection members is a sintered alloy sintered while multiple metal atoms maintain a crystal structure of the metal atoms.

7. The temperature adjustment control device according to claim 5, wherein:

the heat flux sensor further includes a surface protection member disposed on a surface of the insulating base material and having a surface pattern, and a backside protection member disposed on a back surface opposite to the surface and having a backside pattern; and the backside protection member, the insulating base material, and the surface protection member are combined into one unit.

* * * * *